United States Patent
Harper et al.

(10) Patent No.: US 9,864,560 B2
(45) Date of Patent: Jan. 9, 2018

(54) MIRRORING GRAPHICS CONTENT TO AN EXTERNAL DISPLAY

(71) Applicant: Apple Inc., Cupertino, CA (US)

(72) Inventors: John S. Harper, London (GB);
Kenneth C. Dyke, Los Altos, CA (US);
Jeremy Sandmel, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/214,217

(22) Filed: Jul. 19, 2016

(65) Prior Publication Data
US 2017/0017452 A1 Jan. 19, 2017

Related U.S. Application Data

(60) Continuation of application No. 14/601,080, filed on Jan. 20, 2015, now Pat. No. 9,411,550, which is a
(Continued)

(51) Int. Cl.
*G09G 5/00* (2006.01)
*G06F 3/14* (2006.01)
(Continued)

(52) U.S. Cl.
CPC ............ *G06F 3/1431* (2013.01); *G09G 5/12* (2013.01); *G09G 5/373* (2013.01); *G09G 5/377* (2013.01);
(Continued)

(58) Field of Classification Search
None
See application file for complete search history.

(56) References Cited

U.S. PATENT DOCUMENTS

| 5,307,055 A | 4/1994 | Baskin et al. |
| 5,764,201 A | 6/1998 | Ranganathan |

(Continued)

FOREIGN PATENT DOCUMENTS

| EP | 1420336 | 5/2004 |
| JP | H09-146497 | 6/1997 |

(Continued)

OTHER PUBLICATIONS

Nishimura Yoshihiko, "Video Image Recorder", Jan. 16, 1998, Sony Corp., JP19980006954.
(Continued)

*Primary Examiner* — David H Chu
(74) *Attorney, Agent, or Firm* — Blakely, Sokoloff, Taylor & Zafman LLP

(57) ABSTRACT

A data processing system composites graphics content, generated by an application program running on the data processing system, to generate image data. The data processing system stores the image data in a first framebuffer and displays an image generated from the image data in the first framebuffer on an internal display device of the data processing system. A scaler in the data processing system performs scaling operations on the image data in the first framebuffer, stores the scaled image data in a second framebuffer and displays an image generated from the scaled image data in the second framebuffer on an external display device coupled to the data processing system. The scaler performs the scaling operations asynchronously with respect to the compositing of the graphics content. The data processing system automatically mirrors the image on the external display device unless the application program is publishing additional graphics content for display on the external display device.

9 Claims, 12 Drawing Sheets

Related U.S. Application Data division of application No. 13/154,268, filed on Jun. 6, 2011, now Pat. No. 8,963,799.

(60) Provisional application No. 61/431,776, filed on Jan. 11, 2011.

(51) Int. Cl.
*G09G 5/12* (2006.01)
*G09G 5/373* (2006.01)
*G09G 5/377* (2006.01)

(52) U.S. Cl.
CPC . *G06F 2200/1614* (2013.01); *G09G 2340/04* (2013.01); *G09G 2340/0407* (2013.01); *G09G 2340/0435* (2013.01); *G09G 2340/0485* (2013.01); *G09G 2360/04* (2013.01)

(56) References Cited

U.S. PATENT DOCUMENTS

| | | | |
|---|---|---|---|
| 5,874,928 A | 2/1999 | Kou | |
| 6,304,297 B1 | 10/2001 | Swan | |
| 6,788,309 B1 | 9/2004 | Swan et al. | |
| 6,853,355 B1 | 2/2005 | Kang et al. | |
| 7,911,536 B2 | 3/2011 | Dunton | |
| 8,421,808 B2 | 4/2013 | Ishii | |
| 2002/0171765 A1* | 11/2002 | Waki | G09G 5/14 348/589 |
| 2005/0015731 A1 | 1/2005 | Mak et al. | |
| 2005/0128217 A1 | 6/2005 | Cohen | |
| 2005/0259032 A1 | 11/2005 | Morris | |
| 2006/0197757 A1 | 9/2006 | Holub | |
| 2008/0030425 A1* | 2/2008 | Fullerton | G06F 3/1423 345/1.1 |
| 2008/0062625 A1 | 3/2008 | Batio | |
| 2008/0316361 A1 | 12/2008 | Ito | |
| 2009/0228801 A1 | 9/2009 | Lee et al. | |
| 2010/0179873 A1* | 7/2010 | Li | G06Q 30/02 705/14.49 |
| 2010/0216508 A1* | 8/2010 | Ma | G06F 3/1423 455/557 |
| 2010/0217884 A2 | 8/2010 | Chaney et al. | |
| 2010/0295808 A1 | 11/2010 | Seo et al. | |
| 2010/0302141 A1* | 12/2010 | Shankar | G06F 3/1454 345/156 |
| 2012/0030584 A1* | 2/2012 | Bian | G06F 9/4443 715/746 |
| 2012/0050183 A1 | 3/2012 | Lee | |
| 2012/0050331 A1* | 3/2012 | Kanda | G06F 3/1454 345/649 |
| 2012/0075204 A1 | 3/2012 | Murray et al. | |
| 2012/0306899 A1 | 12/2012 | Sandmel et al. | |
| 2013/0120222 A1 | 5/2013 | Graham | |

FOREIGN PATENT DOCUMENTS

| | | |
|---|---|---|
| JP | 10-091135 | 4/1998 |
| JP | 2004-178127 | 6/2004 |
| JP | 2005-208684 | 8/2005 |
| JP | 2006-337859 | 12/2006 |
| JP | 2010-204262 | 9/2010 |
| KR | 10-2006-0006531 | 7/2011 |
| TW | 200948042 A | 11/2009 |

OTHER PUBLICATIONS

PCT International Preliminary Report on Patentability (Chapter I) for corresponding International Application No. PCT/US2012/020790, dated Jul. 25, 2013, 9 pages.
Fabian Canas, "Mirror Displays", URL:http://web.archive.org/web/20101002111147/http://www.fabiancanas.com/Projects/MirrorDisplays.
PCT International Search Report and The Written Opinion of The International Searching Authority, Or The Declaration for PCT/US 12/20790, dated May 3, 2012.
Partial European Search Report, EP 12150735, dated Apr. 30, 2012, 2 pages.
European Search Report, EP 12150735, dated Jul. 19, 2012, 2 pages.

\* cited by examiner

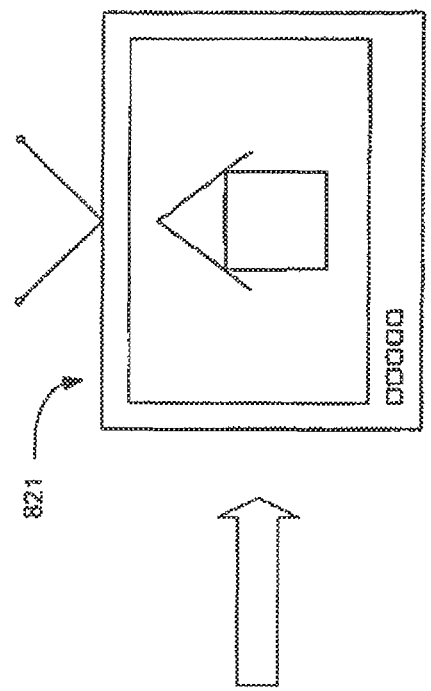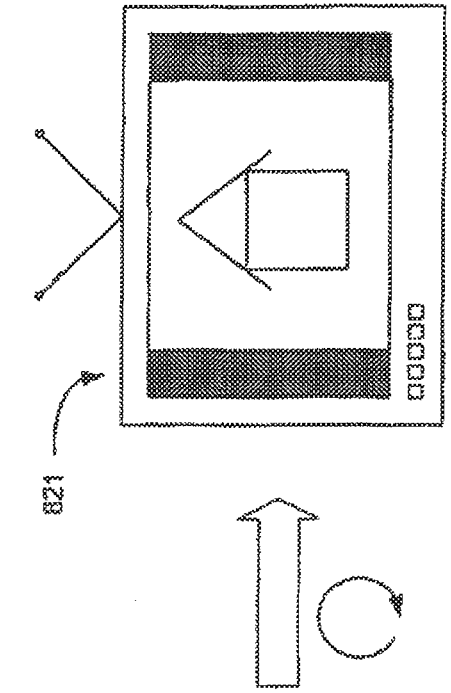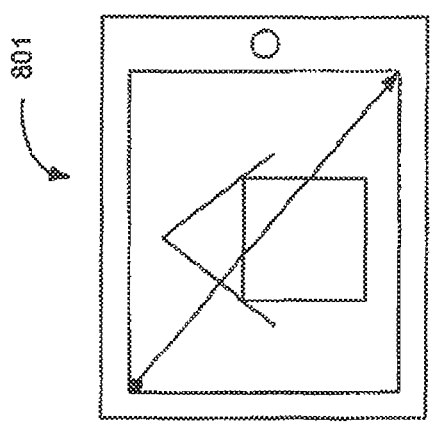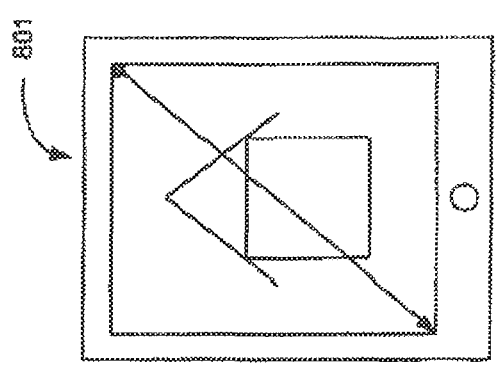
Fig. 8A  Fig. 8B

MIRRORING GRAPHICS CONTENT TO AN EXTERNAL DISPLAY

RELATED APPLICATIONS

This application is a continuation of U.S. application Ser. No. 14/601,080 filed Jan. 20, 2015, which is a divisional of U.S. application Ser. No. 13/154,268 filed on Jun. 6, 2011, now issued as U.S. Pat. No. 8,963,799, which claims the benefit of U.S. Provisional Application No. 61/431,776 filed on Jan. 11, 2011, the contents of which are hereby incorporated by reference herein.

TECHNICAL FIELD

This invention relates to the field of display driving architectures and, in particular, to mirroring graphics content to an external display.

BACKGROUND

Electronic devices, such as computer systems, wireless cellular telephones, mobile computing devices, tablet computing devices or other data processing systems often include a built-in internal visual display device. The internal display device is used to display visual content generated by or stored on the electronic device. The internal display device may be, for example, an internal liquid crystal display (LCD) device.

Certain electronic devices may additionally include a connector, such as an Extended Video Graphics Array (XVGA) connector or other connector known in the art, to connect to an external visual display device. The external display device may be for example a standalone LCD or cathode ray tube (CRT) display. In some instances, the electronic device can be set up such that both the internal display device and the external display device display the same visual content concurrently. This may be referred to as a mirrored mode. Alternatively, certain electronic devices can also be set up so that the two display devices will display different images, such as portions of an extended desktop which allows a user to move a window from one desktop to another desktop by moving a window between the two displays.

SUMMARY OF THE DESCRIPTION

In certain embodiments described herein, a data processing system may composite graphics content, generated by an application program running on the data processing system, to generate image data. The data processing system may store the image data in a first framebuffer and display an image generated from the image data in the first framebuffer on an internal display device of the data processing system. A scaler in the data processing system may perform scaling operations on the image data in the first framebuffer, store the scaled image data in a second framebuffer and display an image generated from the scaled image data in the second framebuffer on an external display device coupled to the data processing system. The scaling operations may include adjusting at least one of the size, resolution, orientation and color of the image data.

The scaler may perform the scaling operations asynchronously with respect to the compositing of the graphics content. In one embodiment, the scaled image data may be associated with a first image frame. The scaler is asynchronous in that it operates separately from other components such as a CPU or GPU. The data processing system may begin compositing graphics content to generate image data associated with a subsequent image frame before the scaling operations are complete for the image data associated with the first image frame.

In one embodiment, the data processing system may determine if an image generated from scaled image data associated with a previous frame has completed displaying on the external display. If the image generated from scaled image data associated with the previous frame has not completed displaying on the external display, the data processing system may drop the scaled image data associated with the first frame.

In another embodiment, the data processing system may automatically mirror the image to the external display device unless the application program is publishing additional graphics content for display on the external display device. The data processing system determines whether the application program is publishing a second graphics content for a second image to display on the external display device, and if the application program is publishing a second graphics content, the data processing system disables the automatic mirroring. In another embodiment, the data processing system may first determine whether the application program is publishing additional graphics content and then enable or disable mirroring accordingly. The mirroring may include the asynchronous scaling operations as described above.

BRIEF DESCRIPTION OF THE DRAWINGS

The present invention is illustrated by way of example, and not by way of limitation, in the figures of the accompanying drawings.

FIGS. 8A and 8B illustrate one example of a scaling operation when mirroring graphics content to an external display, according to an embodiment.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
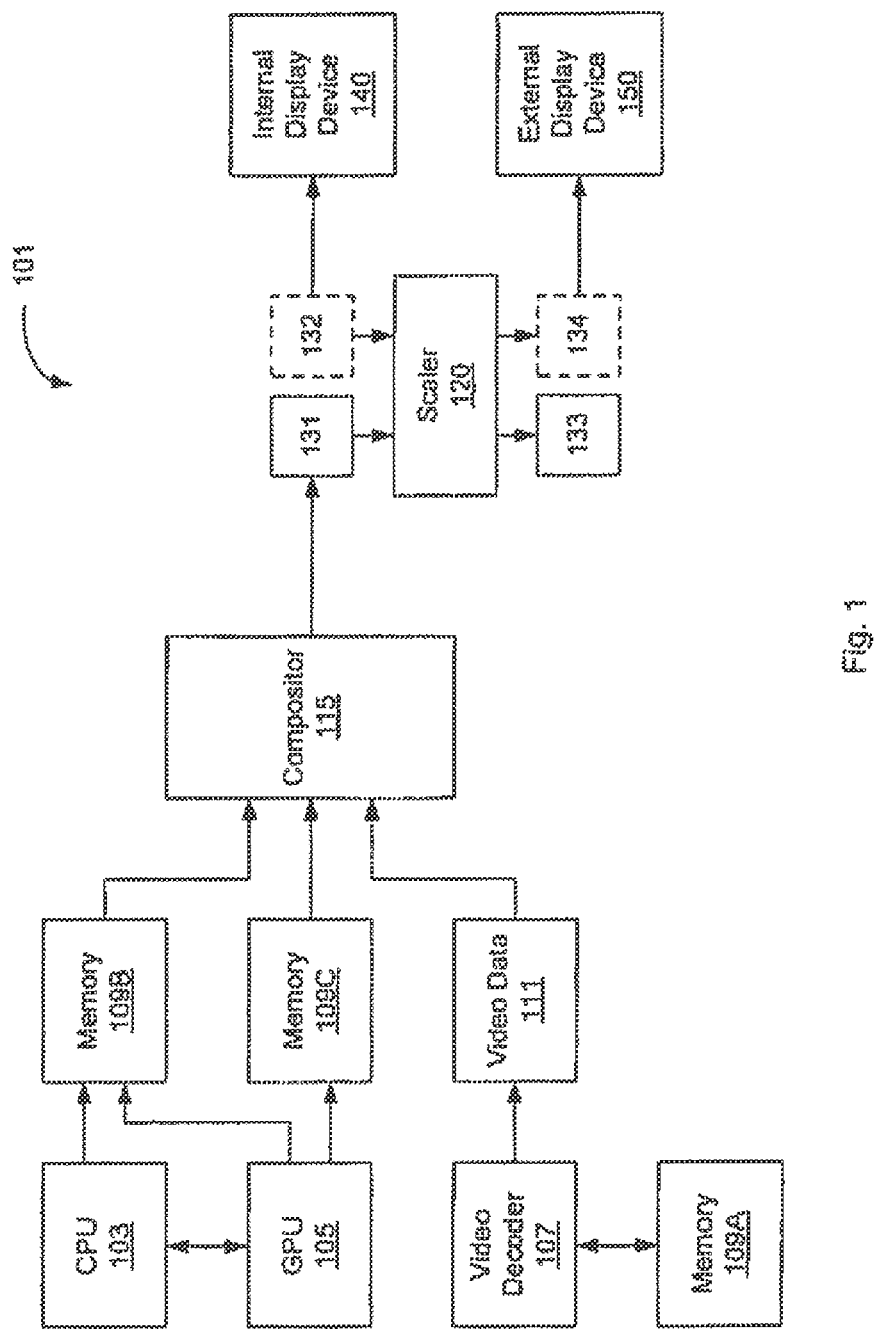
FIG. 1 is a block diagram illustrating a display driving architecture for mirroring graphics content to an external display, according to an embodiment.

FIG. 1 is a block diagram illustrating a display driving architecture for mirroring graphics content to an external display, according to an embodiment of the present invention. In one embodiment, the architecture may include an internal display device 140 and aft optional external display device, such as external display device 150. The data processing system 101 shown in FIG. 1 may be included in portable, general purpose computer systems or portable, special purpose computer systems or other types of data processing systems, such as cellular telephones, smart phones, personal digital assistants, embedded electronic devices or consumer electronic devices. The data processing system 101 can include a processing device 103, such as central processing unit (CPU), including one or more microprocessors. The CPU 103 can be coupled to a graphics processing unit (GPU) 105 through one or more buses as is known in the art.

The data processing system 101 may further include a video decoder 107 which can be a hardware video decoder, a software video decoder, or a video decoder implemented with both hardware and software, to decode compressed and optionally encrypted media data. The video decoder 107 may be employed to decode video from a camera or from a storage device which stores the video content, such as for example a movie. The data processing system 101 can include one or more memory devices, such as RAM, flash, etc. which can store the data used to generate displayable content as well as the displayable content itself. Memories 109A, 109B, and 109C can be either separate memories or the same memory, such as a single integrated circuit or multiple integrated circuits implementing a single memory space, etc. as is known in the art. The CPU 103 and the GPU 105 can generate images or other data to be displayed and store those images in a buffer in memory. As shown in the example of FIG. 1, the GPU 105 can generate images to be displayed and store those images into memory 109B and memory 109C, while the CPU 103 can store images it creates to be displayed into memory 109B. Alternatively, the CPU 103 can write to both memories 109B and 109C while the GPU could write to only one or both memories. The memory 109A can be used to store video data being decoded, such as a compressed or encrypted movie. The output from the video decoder 107 provides video data, which can be temporarily stored, in a memory 111. Memory 109B, memory 109C, and video data memory 111 may be connected to compositor 115.

Compositor 115 may receive an output from the memories 109B and 109C and video data memory 111. In addition, compositor 115 may receive metadata (not shown) used to composite, using techniques known in the art, the images in memories 109B and 109C with the decoded video content from video data memory 111 using the metadata. The metadata may specify the position of source rectangles and position of video data and the position of the images in memories 109B and 109C in order to provide a composited image. For example, a movie may be displayed within a window having a position and size specified by the metadata and this window may be displayed over other images such as a desktop or images of a user interface, such as images provided by memories 109B and 109C. In one embodiment, the output from compositor 115 may be a 24-bit RGB output.

The output of compositor 115 may be stored in a framebuffer. The framebuffer may include a video output device that drives a video display (e.g., internal display device 140 or external display device 150) from one or more memory buffers (e.g., buffers 131-134) containing a complete frame of data (i.e., graphical content). The information in the memory buffers may include color values for every pixel on the screen of the display device. An additional alpha channel may be used to retain information about pixel transparency. In one embodiment the output of compositor 115 is stored in buffer 131 (and optionally in buffer 132 if needed). The contents of buffer 131 may be used to drive internal display device 140.

In one embodiment, processing device 101 may also include scaler 120. Scaler 120 may perform scaling operations on the data stored in buffer 131. This may allow for a mode of operation where graphical content is cloned (i.e., mirrored) to a secondary display, such as external display device 150. External display device 150 may have different properties and/or capabilities than internal display device 140, and the scaling operations allow the graphical content to be displayed correctly on external display device 150. The scaling operations performed by scaler 120 may include adjusting the size, resolution, orientation, color, or other characteristic of the image. Scaler 120 may perform the scaling operations based on input commands received from CPU 103, GPU 105, or some other source. The output of scaler 120 may be stored in buffer 133 (and optionally in buffer 134) if needed. The contents of buffer 133 may be used to drive external display device 150. It will be appreciated that the display devices 140 and 150 may be any one of a variety of types of display devices, such as an LCD (liquid crystal display), an LED (Light Emitting Diode) display, an organic LED display, a CRT (cathode ray tube) display, etc.

In one embodiment, internal display device 140 and external display device 150 may support different frame rates. For example, internal display device 140 may support 60 frames per sec (fps) while external display device 150 only supports 24 fps. Through the techniques described herein, data processing system 101 may attempt to mirror each frame displayed on internal display device 140 to external display device 150. However, the difference in refresh rates may prevent each frame from being fully mirrored. Scaler 120 may be configured to determine when each frame is rendered to internal display device 140 and when the corresponding frame is rendered to external display device 150. If data processing device 101 is not finished rendering a previous frame to external display device 150 when it attempts to render a next frame to internal display device 140, scaler 120 may be configured to drop the next frame, complete rendering of the previous frame, and continue rendering a subsequent frame, once the previous frame has been completed. This process helps to synchronize the graphics content displayed on both the internal display device 140 and the external display device 150.

Figure 2:
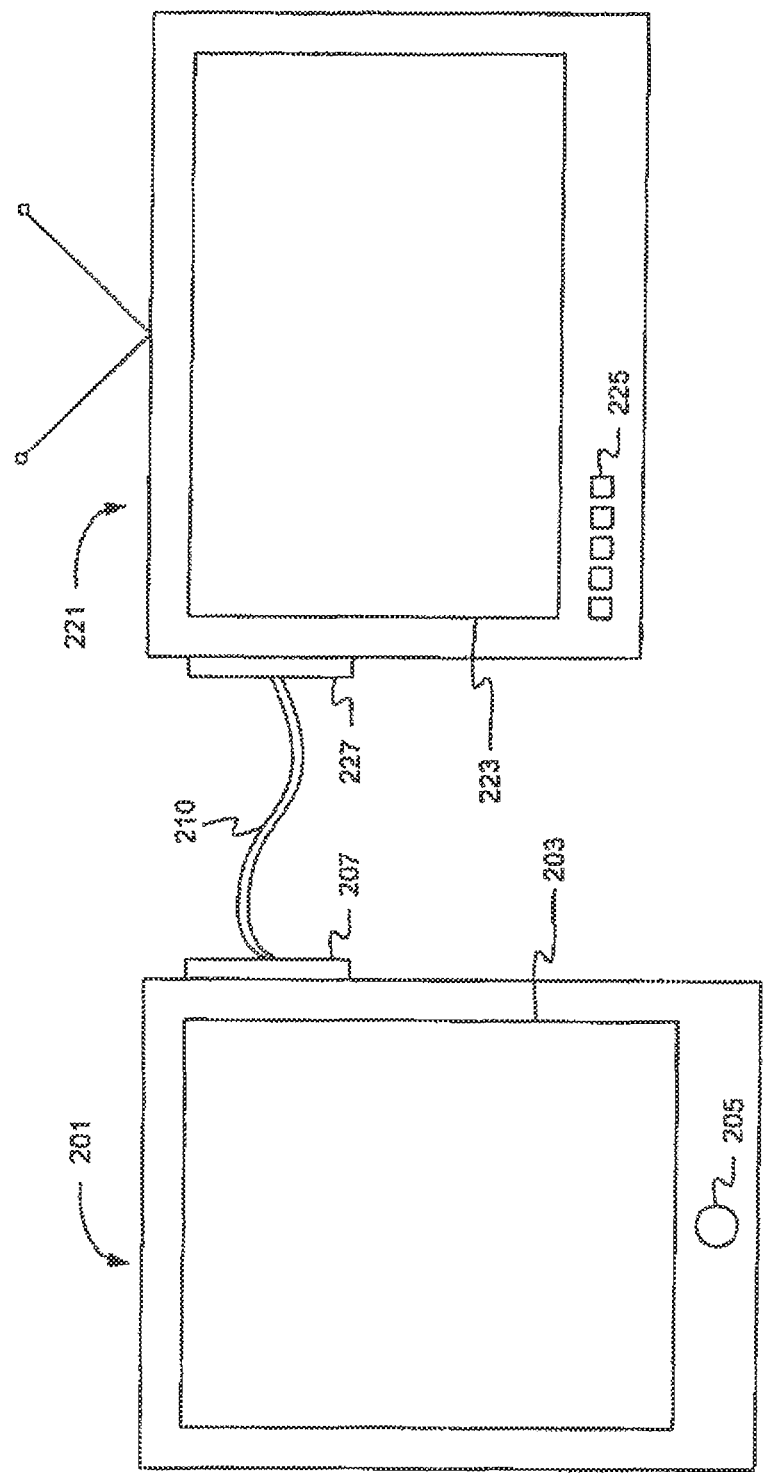
FIG. 2 is a block diagram illustrating a data processing system and external display for mirroring graphics content, according to an embodiment.

FIG. 2 is a block diagram illustrating a data processing system and external display for mirroring graphics content, according to an embodiment of the present invention. In one implementation, the data processing system 201 may be a general purpose or special purpose computer that has the formfactor of a tablet as shown in FIG. 2. A large portion of one surface of the device may include an internal display 203 which can include a multi-touch sensitive touch screen input device integrally mounted and aligned with the internal display 203. The internal display 203 may be one representation of the internal display device 140 shown in FIG. 1. The data processing system 201 may include one or more buttons or switches to allow a user to interact with the device, such as button 205. The data processing system 201 may also include a connector 207 which allows for, among other things, the connection of an external display device, such as external display device 221. It will be appreciated that the data processing system 201 may include other connectors, such as a connector for a charger or power supply, and connectors for synchronization, such as a USB (universal serial bus) connector for a USB cable, etc. The data processing system 201 may also include wireless transceivers, such as a wireless transceiver for WiFi or a wireless transceiver for a cellular telephone or other communications.

In one embodiment, data processing system 201 may be connected to external display device 221 through cable 210. In other embodiments, data processing system 201 and external display device may be connected in some other fashion, such as through wireless communications, as discussed above. A large portion of one surface of the device 221 may include an external display 223. External display device 221 may be one representation of the external display device 150 shown in FIG. 1, and may include, for example, a computer monitor, a television, a projector, or some other display device. External display device 221 may include one or more buttons or switches to allow a user to interact with the device, such as buttons 225. External display device 221 may also include a connector 227 which allows for, among other things, the connection of data processing system 201. It will be appreciated that external display device 221 may include other connectors, as described above with respect to data processing system 201. In one embodiment, according to the techniques described herein, graphics content generated by data processing system 201 and displayed on internal display 203 may be cloned or mirrored to external display device 221 and displayed on external display 223.

Figure 3:
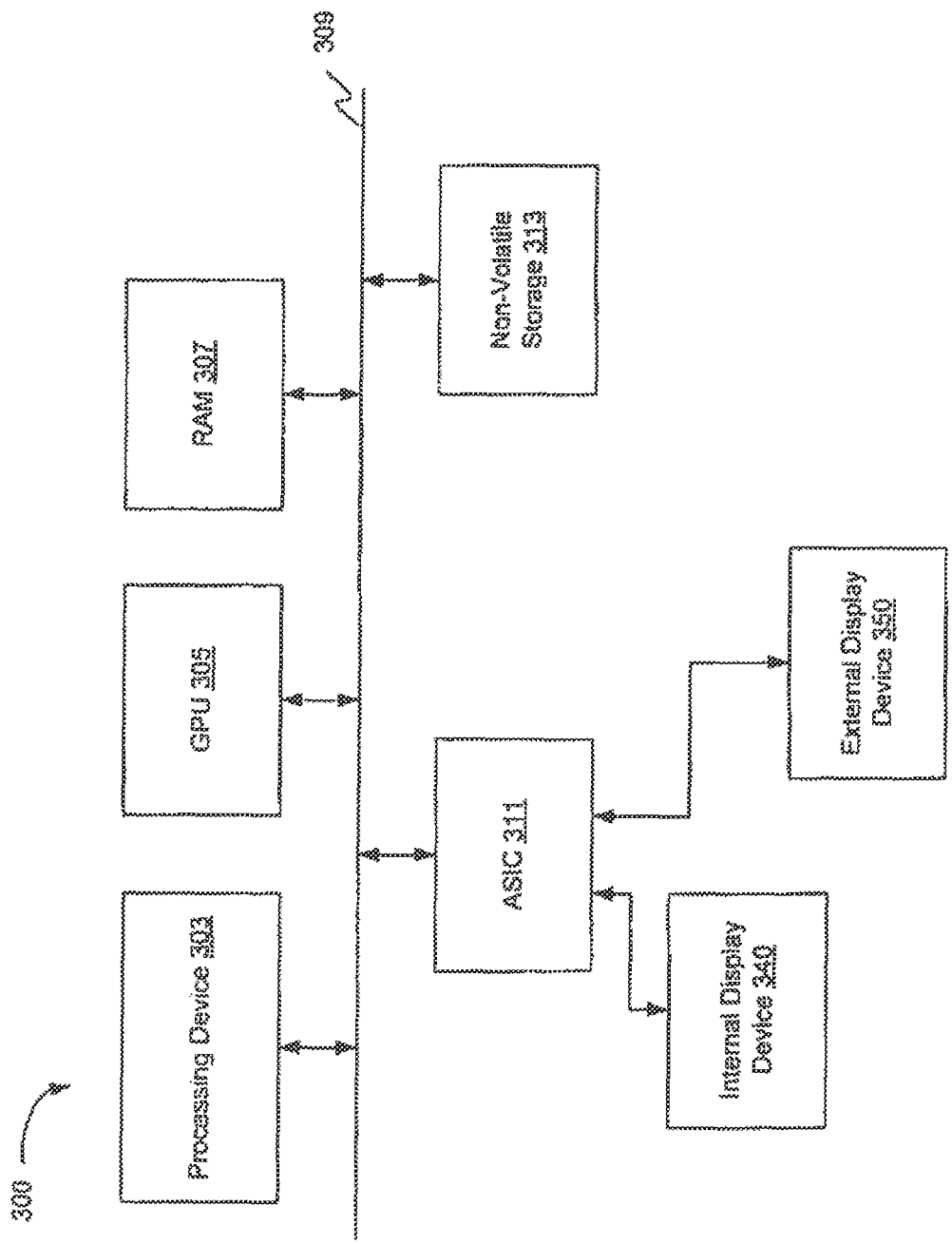
FIG. 3 is a block diagram illustrating a more general example of a display driving architecture for mirroring graphics content to an external display, according to an embodiment.

FIG. 3 is a block diagram illustrating a more general example of a display driving architecture for mirroring graphics content to an external display, according to an embodiment. The architecture 300 may include similar components as the data processing system shown in FIG. 1, where certain components such as the compositor 115 and scaler 120 may be implemented within the ASIC 311 shown in FIG. 2. An ASIC is an application specific integrated circuit which is configured to provide the functionality of the associated components. The memories 109A, 109B and 109C of FIG. 1 may be implemented as random access memory (RAM) 307 which is coupled to the rest of the components shown in FIG. 2 through bus 309. A non-volatile storage 313 may store software, such as operating system components described herein as well as user applications, such as a web browser, an email application, a word processing application, a document viewing application, and other user applications known in the art. The CPU 103 and the GPU 105 of FIG. 1 may be the processing device 303 and the GPU 305 shown in FIG. 3. The internal display 340 shown in FIG. 3 may be the same as the internal display 140 shown in FIG. 1. It will be appreciated that in alternative embodiments the ASIC 311 may implement the processing device 303 and the GPU 305, and the memory 307 and the non-volatile storage 313 may be replaced with flash memory which is coupled to the ASIC 311 through bus 309.

Figure 4:
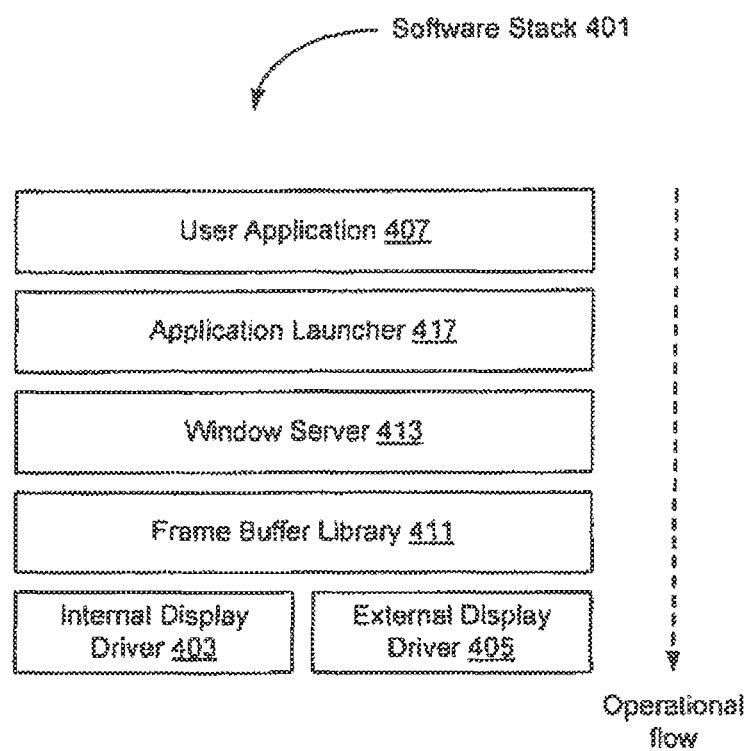
FIG. 4 is a block diagram illustrating a software stack for mirroring graphics content to an external display, according to an embodiment.

FIG. 4 is a block diagram illustrating a software stack for mirroring graphics content to an external display, according to an embodiment of the present invention. The software stack 401 may be implemented on the data processing system 101 shown in FIG. 1 or the data processing system 300 shown in FIG. 3. The various software components in software stack 401 may be stored in a memory such as the RAM 307 or the non-volatile storage 313 or a combination of those memories during execution of the software components. When the components are not being executed they may be stored in a non-volatile storage such as a hard drive or a flash memory, etc.

Software stack may include a number of display drivers, such as internal display driver 403 and external display driver 405, each of which can be configured to communicate with other software components such as the frame buffer library 411 or other components. Internal display driver 403 and external display driver 405 can perform conventional operations with respect to the control of a display (e.g., internal display device 140 and external display device 150, respectively) as is known in the art in addition to aspects relating to the embodiments described herein. The software components in the software stack 401 may employ a traditional call and return process in which a calling application calls to another software process and waits for a return of a value which is the response to the call. Moreover, the software components can employ an application programming interface (API), described herein, to perform these calls.

The frame buffer library 411 in the software stack of 401 may implement software routines for managing frame buffers, such as frame buffers 131-134, to drive the one or more displays of the data processing system. The window server software component 413 may implement known software processes to manage windows for applications. In addition, window server 413 may make API calls to manage operations of compositor 115 and scaler 120. For example, window server 413 may instruct compositor 115 to composite media data received from memories 109B and 109C into a single image frame, which is stored in buffer 131. In one embodiment, a frame may represent the image displayed for $\frac{1}{60}^{th}$ of a second. Window server 413 may also instruct scaler 120 to performed scaling operations on the data in buffer 131 to make it suitable for display on external display device 150.

The application launcher 417 may be a software process that allows a user to launch multiple applications or just one application at a time depending upon the implementation. In one embodiment, the application launcher may be the software program known as Springboard which is an application launcher provided by Apple, Inc. on the iPhone. The user application 407 may be any one of a plurality of user applications, such as a web browser, a document viewer, a picture viewer, a movie player, a word processing or text editing application, an email application, or other application known in the art. The user application 407 can make use of a software framework or one or more software libraries for creating and drawing user graphical content or user interface objects, such as buttons, windows, and other user interface elements and components as are known in the art.

Figure 5A:
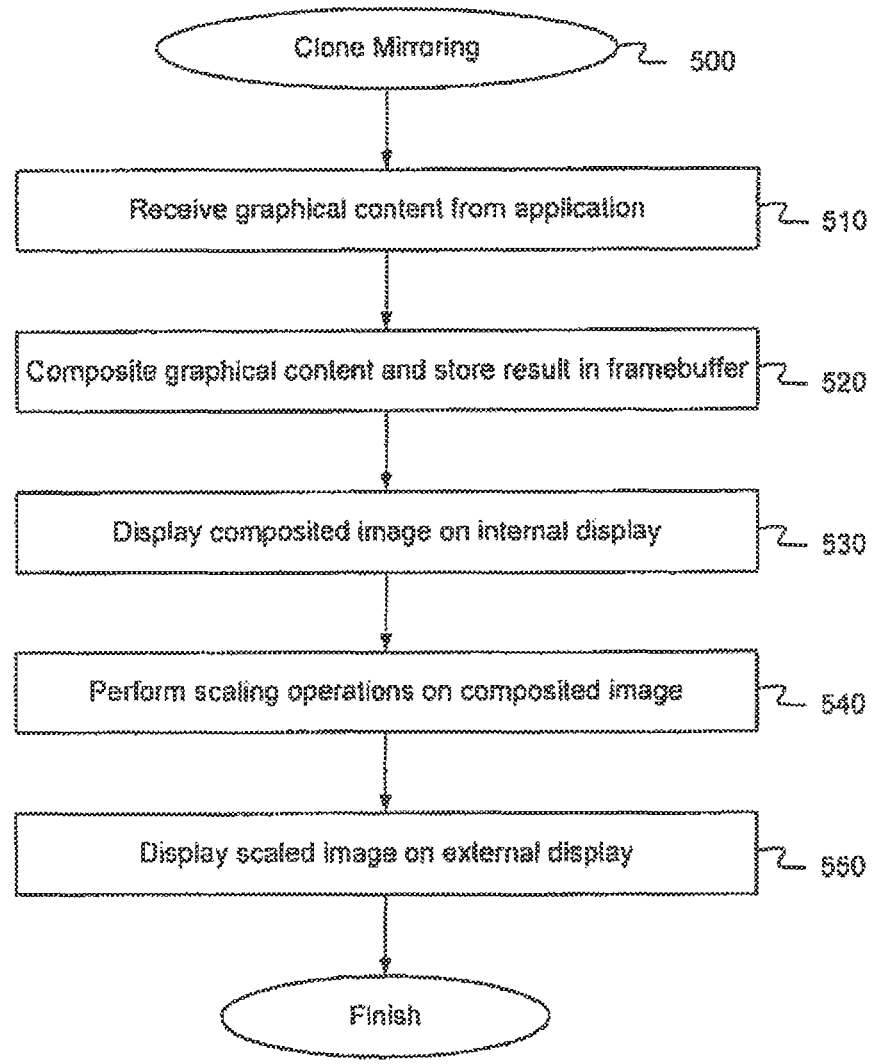
FIGS. 5A and 5B are flow charts illustrating clone mirroring methods, according to an embodiment.

FIG. 5A is a flow chart illustrating a clone mirroring method, according to an embodiment of the present invention. The method 500 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to mirror graphical content to an external display device. In one embodiment, method 500 may be performed by the data processing system 101 shown in FIG. 1 or the data processing system 300 shown in FIG. 3.

Referring to FIG. 5A, at block 510, method 500 receives graphical content from an application. The application may include, for example, user application 407, which may draw multiple pieces of graphical content intended to be displayed as a single image. The graphical content may be temporarily stored in a memory, such as memory 109B or 109C. At block 520, method 500 composites the graphical content into an image (i.e., a frame) and stores the result in the framebuffer. Compositor 115, at the direction of GPU 105, may composite the content from memories 109B and/or 109C into image data and store the result in buffer 131. At block 530, method 500 displays the composited image data from buffer 131 on an internal display, such as internal display device 140.

At block 540, method 500 performs scaling operations on the composited image data, so that the image may be properly displayed on an external display. The external display may have different characteristics than the internal display, and thus the scaling operations may include adjusting the size, resolution, orientation, color, or other characteristics of the image. In one embodiment, the scaling operations may be performed by scaler 120. The scaled image data output by scaler 120 may be stored in another framebuffer, such as buffer 133. At block 550, method 500 displays the scaled image data from buffer 133 on an external display, such as external display device 150.

Figure 5B:
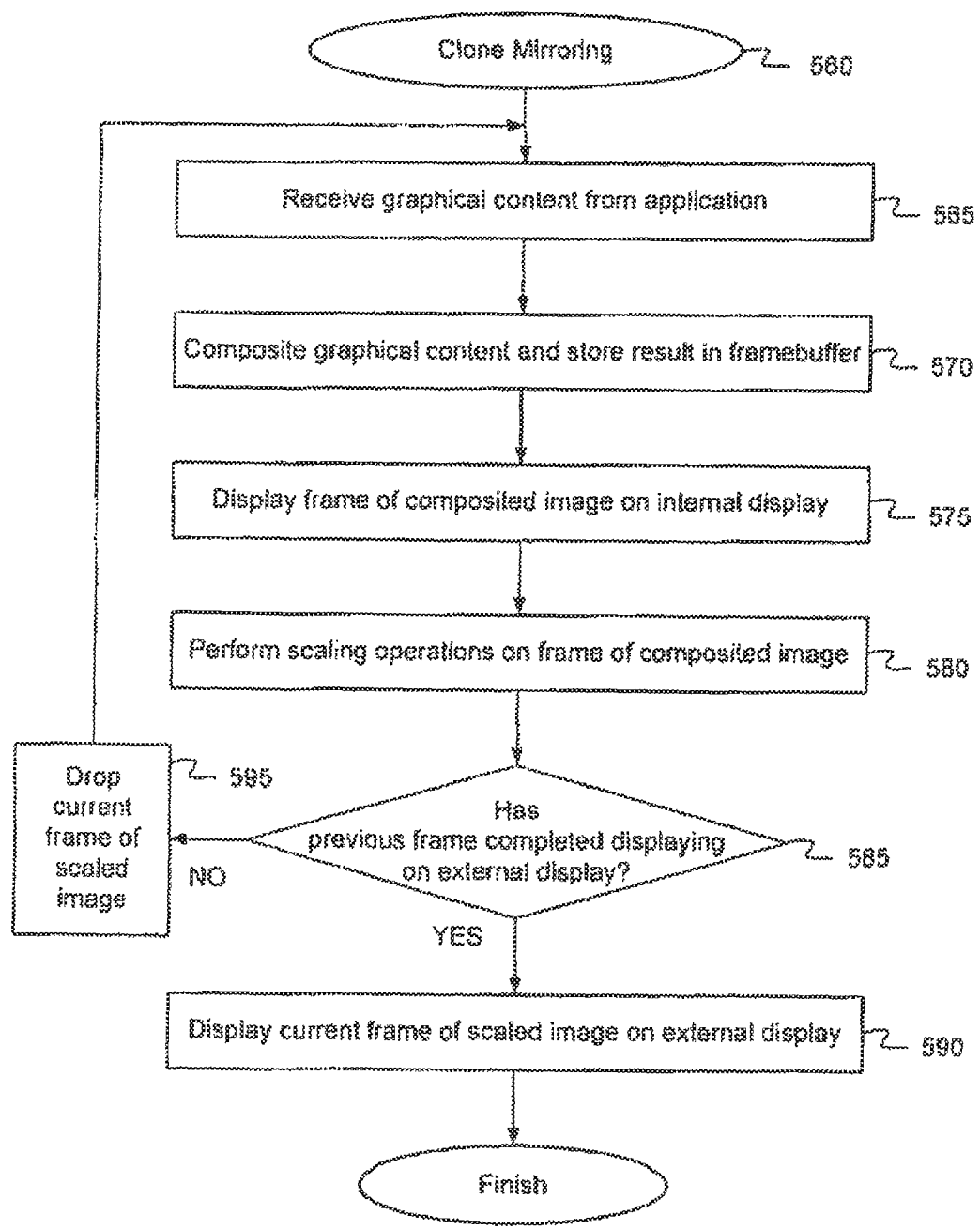

FIG. 5B is a flow chart illustrating a clone mirroring method, according to an embodiment of the present invention. The method 560 may be performed by processing logic configured to mirror graphical content to an external display device. In one embodiment, method 560 may be performed by the data processing system 101 shown in FIG. 1 or the data processing system 300 shown in FIG. 3.

Referring to FIG. 5B, at block 565-580, method 560 performs the steps of receiving graphical content from an application, compositing the graphical content and storing the result in the framebuffer, displaying a frame of the composited image on the internal display and performing scaling operations on the frame of the composited image, as described above with respect to blocks 510-540 of FIG. 5A. At block 585, method 500 determines whether a previous frame has completed displaying on the external display device to which the graphics content is being mirrored. For example, the window server software component 413 may receive an indication from external display driver 405 when the entire contents of a frame buffer, such as frame buffer 133 have been displayed on external display device 150. Since the operations of scaler 120 are asynchronous, processing on a subsequent frame of the image may have already begun. If at block 585, method 500 determines that the previous frame has been completely displayed, at block 590, method 500 displays the current frame of the scaled image data on the external display. If, however, method 500 determines that the previous frame has not been completely displayed, rather than displaying the current frame, at block 595 method 500 drops the current frame of the scaled image and returns to block 565 to being processing on a subsequent frame. Dropping the current frame in this situation can help to prevent image lag and ensure that the internal display and the external display remain synchronized.

Figure 6A:
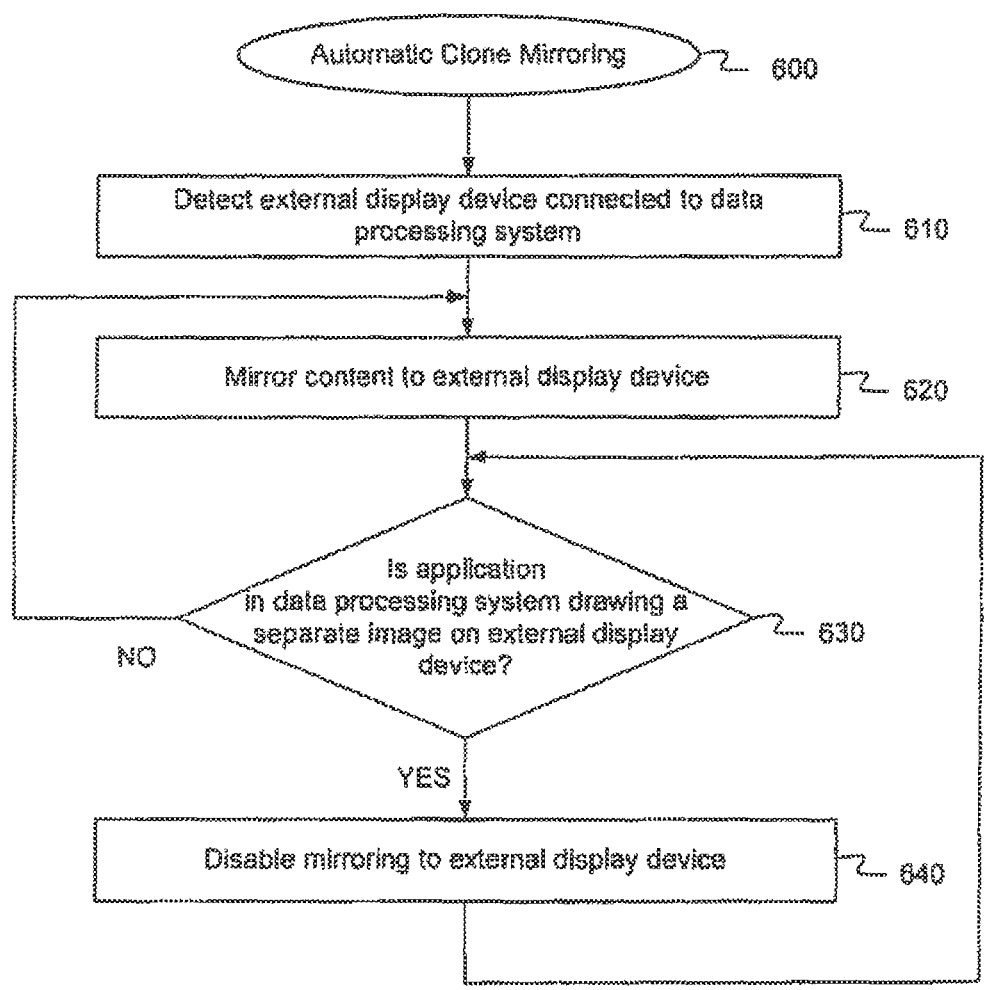
FIGS. 6A and 6B are flow charts illustrating automatic clone mirroring methods, according to an embodiment.

FIG. 6A is a flow chart illustrating an automatic clone mirroring method, according to an embodiment of the present invention. The method 600 may be performed by processing logic configured to automatically mirror graphical content to an external display device if a user application is not already publishing graphical content for display on the external display device. In one embodiment, method 600 may be performed by the data processing system 101 shown in FIG. 1 or the data processing system 300 shown in FIG. 3.

Referring to FIG. 6A, at block 610, method 600 detects the presence of an external display device connected to the data processing system. In one embodiment, external display driver 405 may send a signal to other software components when a cable (e.g., cable 210) is connected to a connector 207 of the data processing system 201. At block 620, method 600 mirrors graphical content drawn by a user application to the external display device. The mirroring may be performed according to the method 500, described above with respect to FIG. 5A. In one embodiment, the data processing system may be configured to always mirror the graphical content, whether or not an external display is connected. In other embodiments, however, the mirroring may be enabled upon detection of the external display.

At block 630, method 600 determines if a user application running on the data processing system is drawing a separate image, specifically intended to be displayed on an external display device. Some application may display separate content on the internal and external displays. For example, a media player application (e.g., a movie player) may display the actual media content on the external display device while displaying controls (e.g., play, pause, stop, fast forward, rewind, etc.) on the internal display device. The application may designate specific content for either the internal or external display in metadata with the image or through some other identifier. At block 630, method 600 searches for graphics content that is designated specifically for an external display. If at block 630, method 600 determines that the application has not provided a separate image for the external display device, method 600 may continue mirroring the graphics content to the external display at block 620. If at block 630, method 600 determines that the application has provided a separate image for the external display device, at block 640, method 600 disables mirroring to the external display device and displays the separate image on the external display.

Figure 6B:
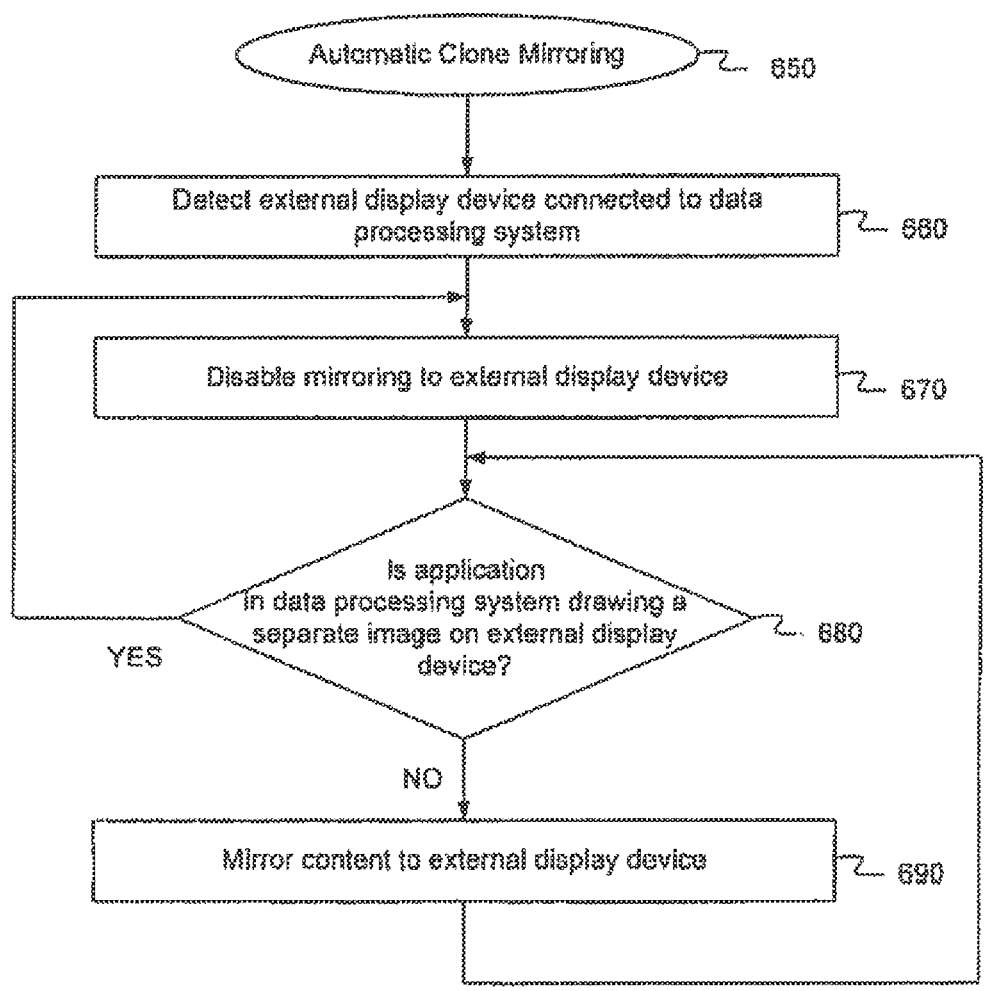

FIG. 6B is a flow chart illustrating an automatic clone mirroring method, according to an embodiment of the present invention. In one embodiment, method 650 may be performed by the data processing system 101 shown in FIG. 1 or the data processing system 300 shown in FIG. 3.

Referring to FIG. 6B, at block 660, method 650 detects the presence of an external display device connected to the data processing system, as in FIG. 6A. In other embodiments, the processing system may be pre-configured with a default setting (e.g., mirroring enabled or disabled) which is used without detecting the presence of an external display device. At block 670, method 650 disables mirroring to the external display device. In one embodiment, this may be the default setting, and thus, no change is required. At block 680, method 650 determines if a user application running on the data processing system is drawing a separate image, specifically intended to be displayed on the external display device. If at block 680, method 650 determines that the application has provided a separate image for the external display device, method maintains the mirroring in a disabled state and displays the separate image on the external display. If at block 680, method 600 determines that the application has provided a separate image for the external display device, at block 690, method 650 enables mirroring and mirrors the graphics content to the external display. In other embodiments, the data processing system may first determine if the application is drawing a separate image for display on an external display device and then make the determination whether to enable or disable mirroring accordingly.

Figure 7:
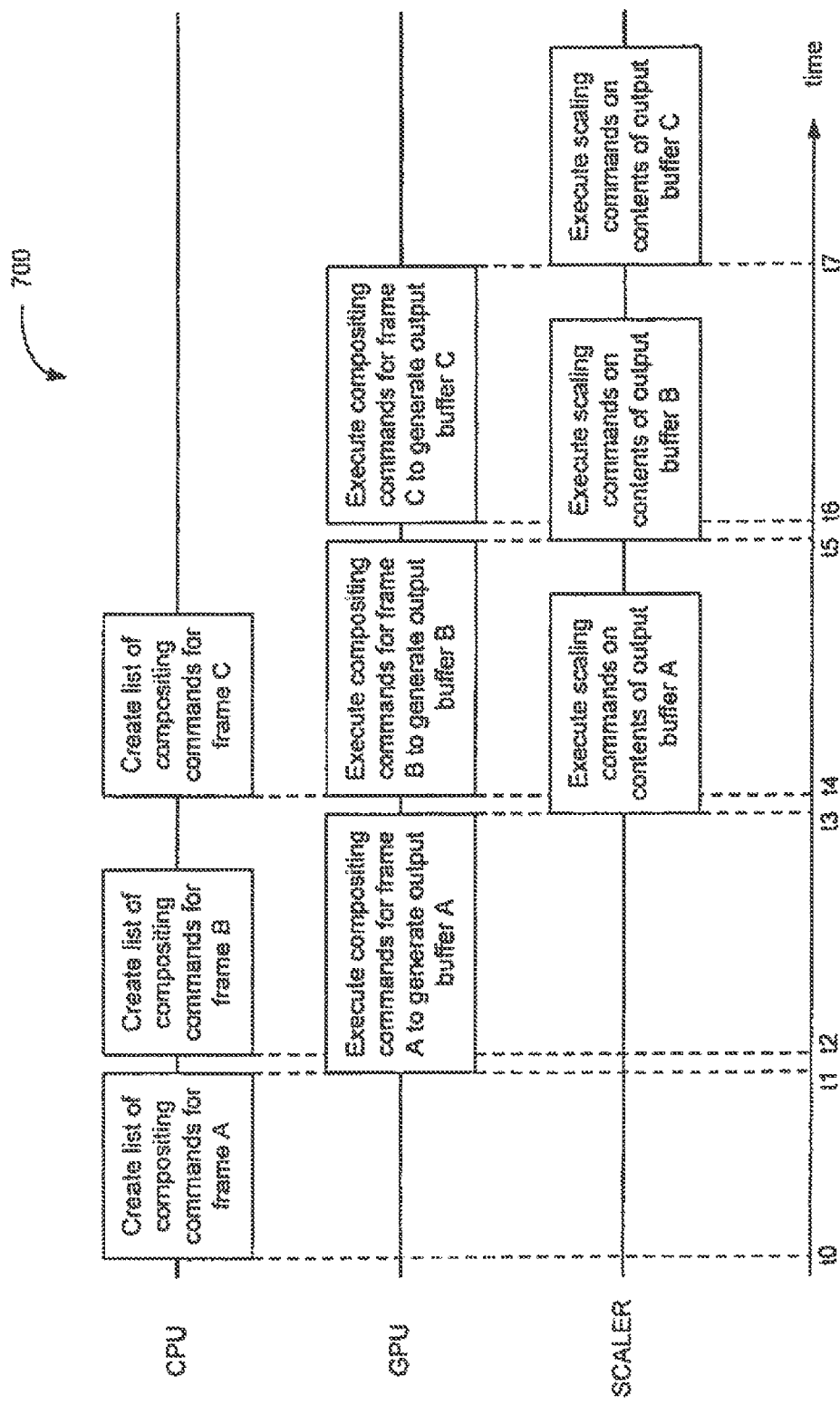
FIG. 7 is a block diagram illustrating a timeline for clone mirroring operations, according to an embodiment.

FIG. 7 is a block diagram illustrating a timeline for clone mirroring operations, according to an embodiment. The timeline 700 illustrates the relative timing at which different operations related to mirroring graphics content to an external display occur. The operations may be performed by a data processing system, such as data processing system 101 shown in FIG. 1 or data processing system 300 shown in FIG. 3. In this example, timeline 700 includes three separate timelines illustrating a subset of the operations performed by a CPU (such as CPU 103), a GPU (such as GPU 105) and a scaler (such as scaler 120). Timeline 700 illustrates how, in one embodiment, the CPU, GPU and scaler may asynchronously schedule operations with respect to one another. Asynchronous scheduling may allow operations to be performed on one frame before all operations are completed for the previous frame. This may result in a more efficient use of system resources.

In one embodiment, the CPU may be responsible for creating a list of compositing commands for a series of frames A, B and C. Creating the list of compositing commands may include specifying which pieces of graphics data (and their location in memories 109B, 109C) should be composited into each frame. Creating the list of compositing commands for frame A may take a certain amount of time (e.g., from time t0 to time t1). When the CPU has finished creating the list of compositing commands for frame A at t0, the GPU may begin executing the compositing commands for frame A in order to generate content for output buffer A (e.g., frame buffer 131). Executing the composing commands for frame A may take a certain amount of time (e.g., from time t1 to time t3). If the CPU does not have other instructions to process (e.g., from other applications), the CPU may begin creating a list of compositing commands for a subsequent frame B. This may occur, for example, at time t2, even before processing of frame A by the entire system is complete.

When the GPU has finished executing the compositing commands for frame A at time t3, the scaler may begin to execute scaling commands on the contents of output buffer A. The scaling commands may include those discussed above for scaler 120, or other commands. If the GPU does not have other operations to perform, the GPU may begin executing the compositing commands for frame B to generate content for output buffer B at time t4. When the GPU finishes executing the compositing commands for frame B, at time t5, the scaler may begin executing scaling commands on the contents of the output buffer B. Similarly, when the GPU begins executing the compositing command for frame B, at time t4, the CPU may begin to create a list of compositing commands for another subsequent frame C. At time t6, the GPU may begin executing compositing commands for frame C to generate output buffer C, and at time t7, the scaler may begin executing scaling commands on the contents of output buffer C. The execution of operations by the CPU, GPU and scaler may continue in a similar asynchronous fashion for all subsequent frames to be processed by the data processing system.

FIGS. 8A and 8B illustrate one example of a scaling operation when mirroring graphics content to an external display, according to an embodiment. The scaling operation illustrated in FIGS. 8A and 8B includes rotation of the image. In some embodiments, data processing system 801 may be configured to automatically rotate an image, if the data processing system 801 is turned or rotated, so that the image always appears in the same orientation, relative to the user. For example, the house shown on the display of data processing system 801 is oriented correctly regardless of how the data processing system 801 is turned in FIGS. 8A and 8B. This orientation may affect the mirrored image on an external display.

In FIG. 8A, data processing system 801 and external display device 821 are oriented in the same manner (i.e., with the longer edge being horizontal). When the graphical content is mirrored to external display device 821 by data processing system 801 (e.g. through method 500), the scaler does not need to rotate the image, as it will still be displayed correctly. In FIG. 8B, however, data processing system 801 is rotated so that it is oriented at a different angle with respect to external display device 821. If the graphics content was mirrored directly to external display device 821, the image would appear to be turned on its side. The scaler (e.g., scaler 120) may receive information about the orientation of the data processing system 801 from other system components or through user input, and may rotate the image accordingly during the scaling process. This results in the image being oriented correctly when displayed on external display device 221. Rotating the image may result in a change in the aspect ratio between the internal display and the external display. In some embodiments, black bars may be added to the displayed image to maintain the correct ratio, as shown in FIG. 8B.

The scaling operation illustrated in FIGS. 8A and 8B may additionally include an adjustment of the aspect ratio the displayed image. For example, in one embodiment shown in FIG. 8A, the internal display of data processing system 801 may have a first aspect ratio, such as 4:3. External display device 821 may have a different aspect ratio from the internal display, such as for example, 16:9. The scaler (e.g., scaler 120) may receive information about the aspect ratio of external display device 821 from external display device 821 itself, or through user input, and may adjust the aspect ratio of the image accordingly during the scaling process.

Figure 9:
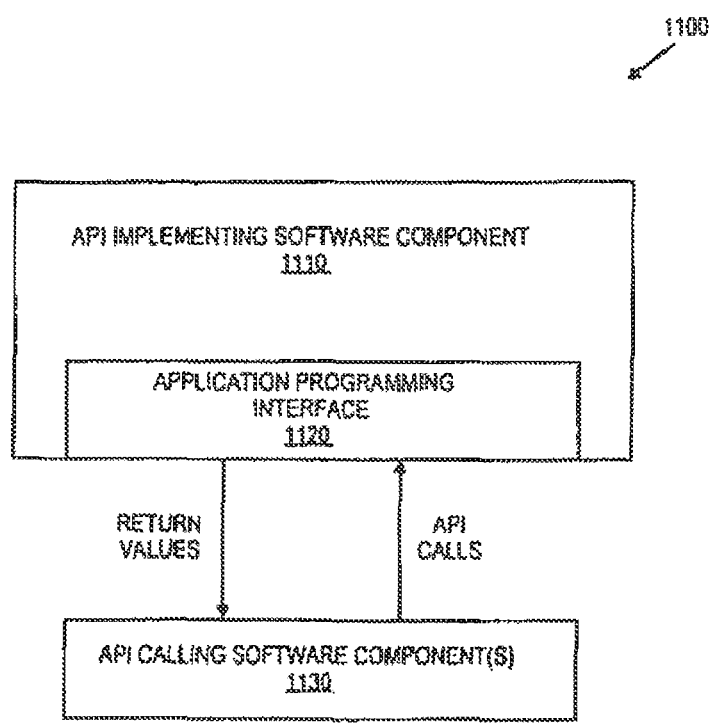
FIG. 9 is a block diagram showing an exemplary API architecture, according to an embodiment.

FIG. 9 is a block diagram illustrating an exemplary API architecture, which may be used in some embodiments of the invention. As shown in FIG. 9, the API architecture 1100 includes the API implementing component 1110 (e.g., an operating system, a library, a device driver, an API, an application program, or other module) that implements the API 1120. The API 1120 specifies one or more functions, methods, classes, objects, protocols, data structures, formats and/or other features of the API implementing component that may be used by the API calling component 1130. The API 1120 can specify at least one calling convention that specifies how a function in the API implementing component receives parameters from the API calling component and how the function returns a result to the API calling component. The API calling component 1130 (e.g., an operating system, a library, a device driver, an API, an application program, or other module), makes API calls through the API 1120 to access and use the features of the API implementing component 1110 that are specified by the API 1120. The API implementing component 1110 may return a value through the API 1120 to the API calling component 1130 in response to an API call.

It will be appreciated that the API implementing component 1110 may include additional functions, methods, classes, data structures, and/or other features that are not specified through the API 1120 and are not available to the API calling component 1130. It should be understood that the API calling component 1130 may be on the same system as the API implementing component 1110 or may be located remotely and accesses the API implementing component 1110 using the API 1120 over a network. While FIG. 9 illustrates a single API calling component 1130 interacting with the API 1120, it should be understood that other API calling components, which may be written in different languages (or the same language) than the API calling component 1130, may use the API 1120.

The API implementing component 1110, the API 1120, and the API calling component 1130 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 10:
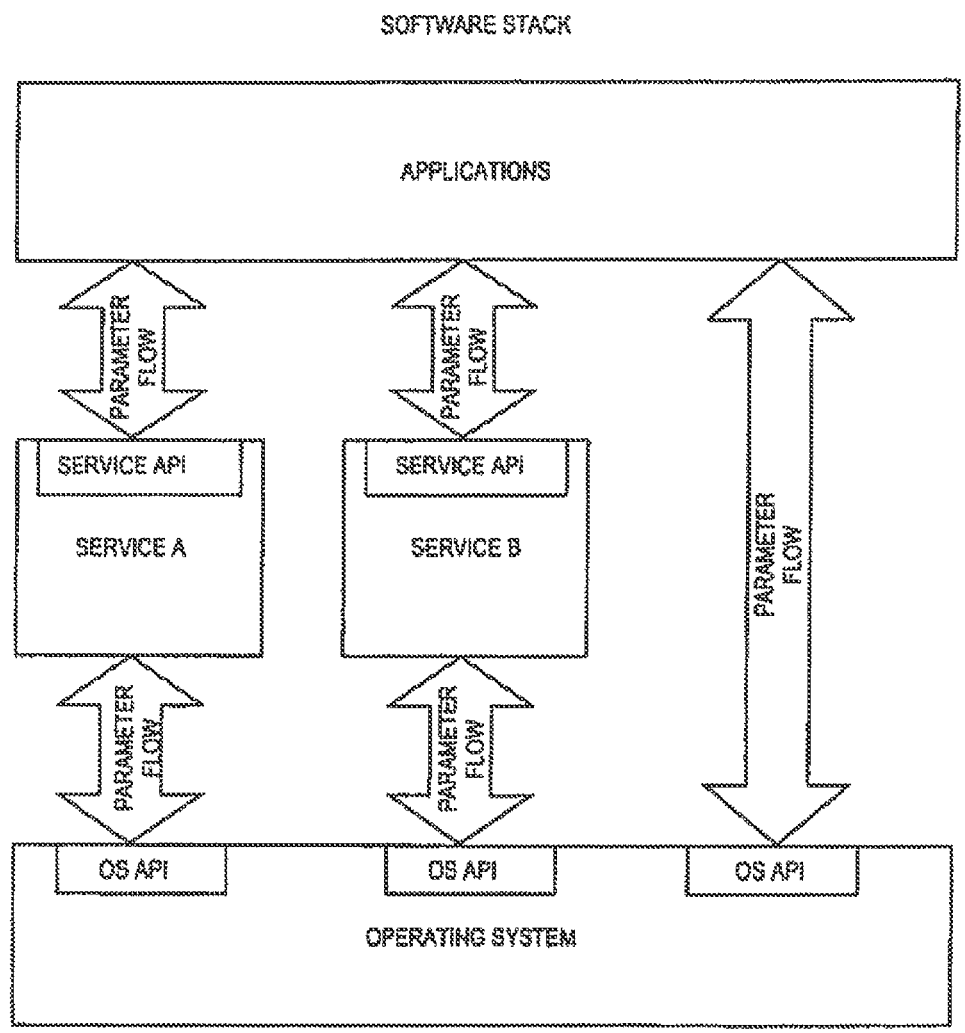
FIG. 10 shows an example of a software stack using one or more APIs, according to an embodiment.

In FIG. 10 ("Software Stack"), an exemplary embodiment, applications can make calls to Services A or B using Service API and to Operating System (OS) using OS API. Services A and B can make calls to OS using OS API.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the present invention include various operations, which are described above. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing device(s).

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the above descriptions, embodiments have been described in terms of objects in an object-oriented environment. It should be understood, that the invention is not limited to embodiments in object-oriented environments and that alternative embodiments may be implemented in other programming environments having characteristics similar to object-oriented concepts.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method comprising:
    compositing, by a data processing system, graphics content to generate frames of image data for an internal display, the graphics content generated by an application executing on the data processing system;
    storing the image data in a first framebuffer;
    displaying an image generated from the image data in the first framebuffer on the internal display of the data processing system;
    detecting if an external display is coupled to the data processing system;
    when an external display is detected, determining if the application has generated separate graphics content for the external display;
    when the application has not generated separate graphics content;
        performing, by a scaler, scaling operations on the image data in the first framebuffer, wherein the scaler performs the scaling operations asynchronously with respect to the compositing of the graphics content with the compositing for a current image frame started before the scaling is complete for a previous image frame;

storing the scaled image data in a second framebuffer;

dropping the scaled image data associated with the current image frame if the image generated from scaled image data associated with the previous image frame has not completed displaying on the external display; and sending data for displaying an image generated from the scaled image data in the second framebuffer to the external display.

2. The method of claim 1, wherein the scaling operations comprise adjusting at least one of the size, resolution, orientation and color of the image data.

3. The method of claim 2, wherein the scaling operations rotate the image data when the data processing system is oriented at a different angle than the external display.

4. An apparatus comprising:
a processing device configured to generate a list of compositing commands for graphics content to be displayed on an internal display, the graphics content generated by an application executing on the apparatus;
a graphics processing unit, coupled to the processing device, configured to execute the list of compositing commands to generate frames of image data based on the graphics content;
the internal display, coupled to the graphics processing unit, configured to display an image generated from the image data; and
a scaler unit, coupled to the graphics processing unit, configured to perform scaling operations on the image data to generate scaled image data when the image for the internal display is to be displayed on an external display, wherein the scaler unit performs the scaling operations asynchronously with respect to operations of the processing device and the graphics processing unit with the compositing for a current image started before the scaling is complete for a previous frame, and further drops the scaled image data associated with the current image frame if the image generated from scaled image data associated with the previous image frame has not completed displaying on the external display, and wherein the scaling operations are not performed when the application has generated separate graphics content for the external display.

5. The apparatus of claim 4, wherein the scaling operations comprise adjusting at least one of the size, resolution, orientation and color of the image data.

6. The apparatus of claim 5, wherein the scaling operations rotate the image data when the data processing system is oriented at a different angle than the external display.

7. A non-transitory machine readable storage medium storing instructions which when executed cause a data processing system to perform a method comprising:
compositing graphics content to generate frames of image data for an internal display, the graphics content generated by an application executing on the data processing system;
storing the image data in a first framebuffer;
displaying an image generated from the image data in the first framebuffer on the internal display of the data processing system;
detecting if an external display is coupled to the data processing system;
when an external display is detected, determining if the application has generated separate graphics content for the external display;
when the application has not generated separate graphics content;
performing, by a scaler, scaling operations on the image data in the first framebuffer, wherein the scaler performs the scaling operations asynchronously with respect to the compositing of the graphics content with the compositing for a current image frame started before the scaling is complete for a previous frame;
storing the scaled image data in a second framebuffer;
dropping the scaled image data associated with the current image frame if the image generated from scaled image data associated with the previous image frame has not completed displaying on the external display; and
sending data for displaying an image generated from the scaled image data in the second framebuffer to the external display.

8. The storage medium of claim 7, wherein the scaling operations comprise adjusting at least one of the size, resolution, orientation and color of the image data.

9. The storage medium of claim 8, wherein the scaling operations rotate the image data when the data processing system is oriented at a different angle than the external display.

* * * * *